United States Patent Office 2,848,413
Patented Aug. 19, 1958

2,848,413
NOVEL MIXTURES OF QUATERNARY AMMONIUM SALTS

Walter H. Schuller, Delray Beach, Fla., assignor to American Cyanamid Company, New York, N. Y., a corporation of Maine No Drawing. Application May 22, 1957
Serial No. 660,756

2 Claims. (Cl. 252—8.8)

This invention relates to new composition of matter. More particularly, it relates to mixtures of quaternary ammonium salts which find utility as antistatic agents for synthetic fibers. More specifically, it relates to equimolar mixtures of the polyethoxamer of N,N,N-tris-(2-hydroxyethyl) - N - (4 - amino - 6 - anilino - s - triazinylmethyl) ammonium chlorides and N - (4 - amino - 6 - anilino - s-triazinylmethyl) - N,N,N - trimethylammonium chloride.

The mixtures of the present invention find particular utility as antistatic compositions for the treatment of textile materials, for example the polyamides as nylon, the polyesters as Acrilan and the acrylics as Creslan. As such, they impart durable antistatic characteristics to such textile materials even after repeated washings.

According to the present invention, a mixture of the polymethylol derivatives of a polyethoxamer of N,N,N-tris - (2 - hydroxyethyl) - N (4 - amino - 6 - anilino - s - triazinylmethyl) ammonium chloride and N - (4 - amino-6 - anilino - s - triazinylmethyl) - N,N,N - trimethylammonium chloride can be prepared by reacting a chloroacetoguanamine with triethylamine, formaldehyde and an ethoxamer of tris - (2 - hydroxyethyl) amine. For instance, the reaction may be illustrated in the following manner:

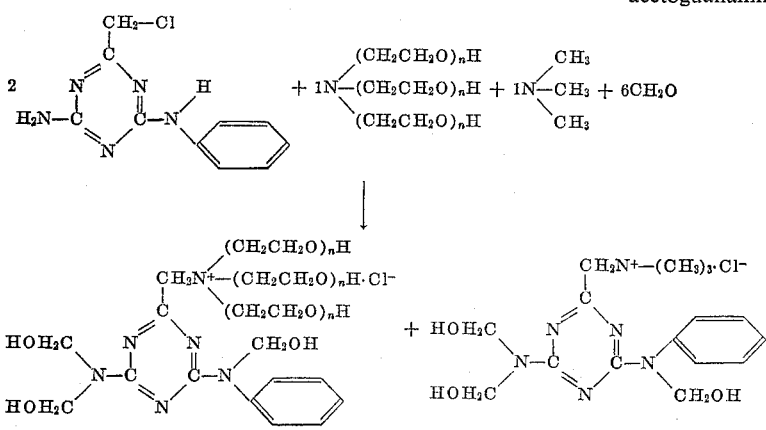

where $n$ is an integer of from 2 to 11.

It is a feature of the present invention that the reactants can be conveniently prepared. The N-phenyl-α-chloroguanamine reactant is obtained from the reaction of N-phenyl biguanide and ethyl chloroacetate at elevated temperatures as more fully described in my copending application, Serial No. 660,745 filed on even date. Although N-phenyl-chloroacetoguanamine is specifically disclosed, it is within the purview and contemplation of this invention that other guanamines such as chloroacetoguanamine, or bromoacetoguanamine, or N-phenyl-α-bromoacetoguanamine may be similarly employed. As will be noted from the above equation, two moles of the acetoguanamine will be required.

The polyethoxamer of tris-(2-hydroxyethyl) amine is prepared by reacting from three to thirty or more moles of ethylene oxide with tris-(2-hydroxyethyl) amine. The corresponding polyethoxamer is thus formed.

It is a good practice to use about six moles of formaldehyde or an equivalent thereof, although a small mole excess can be employed satisfactorily. It has been found that an excess of formaldehyde is desirable for the reason that such excess will insure completeness of reaction. Where less than six moles are used, the mono or dimethylol derivatives are obtained.

The invention will be illustrated in conjunction with the following examples that are to be taken as illustrative only and not by way of limitation.

Example 1

Preparation of equimolar mixture of the trimethylol derivatives of (a) the diethoxamer of N,N,N-tris-(2-hydroxyethyl) - N - (4 - amino - 6 - anilino - s - triazinylmethyl) ammonium chloride and (b) N - (4 - amino - 6-anilino - s - triazinylmethyl) - N,N,N - trimethyl ammonium chloride.

To 35.4 g. (0.15 mole) of N-phenyl-α-chloroacetoguanamine is added 64 g. of water and 63.8 g. (0.173 mole) of a diethoxamer of tris-(2-hydroxyethyl) amino, prepared by reacting two moles of ethylene oxide with tris-(2-hydroxyethyl) amine (99.6% active material by titration). The mixture is heated for three and one half hours at 70° C.–89° C. A titration for chloride ion indicates that no reaction is obtained under these conditions. The solvent is thus stripped off under reduced pressure and replaced with 100 ml. of butyl Cellosolve (B. P. 163° C.–172° C.). The resultant solution is stripped further at atmospheric pressure until a temperature of 179° C. is obtained. Heating under reflux is then carried out for two and one half hours at 170° C. A titration of an aliquot with standard hydrochloric acid indicates that 58% reaction of the tertiary amine had been obtained. At this point, 46.2 g. (0.196 mole) of N-phenyl-α-chloroacetoguanamine is added and the mixture stripped further at atmospheric pressure until a temperature of 193° C. is reached. Resulting solution is heated for an additional half hour at 185° C. A titration with acid indicates that no unreacted tertiary amine is present. The completeness of the quaternarization is further attested to by the observation that the reaction mixture is pH 6. To this reaction mixture is added 300 ml. of water and the mixed solvents removed by stripping under reduced pressure. To the residue is added 102 g. (0.52 mole) of a 30% aqueous solution of trimethylamine and 100 ml. of isopropanol. Resultant solution is heated for four hours at 80° C.–87° C. and then is concentrated. The concentrate is adjusted to pH 10 by the addition of 10 N sodium hydroxide solution. 66 g. of paraformaldehyde (2.2 equivalents of formaldehyde) is added and the mixture heated at 87° C.–88° C. for two hours. Several small additions of 10 N sodium hydroxide are required in order to maintain a pH of 9–10.

*Example 2*

This example illustrates the utility of the mixture of the preceding example as an antistatic composition.

5 parts of the mixture prepared by the preceding example is dissolved in 95 parts of water. A 9" x 9" sheet of nylon is next immersed in the solution, passed through squeeze rollers and then oven-dried to remove all residual moisture. The dried sheet is folded over twice in the same direction to obtain a sheet measuring 2¼" x 9". A charge is induced on the sheet by stroking the same with a glass rod for some fifteen minutes. Now the sheet is exposed to carbon particles that are placed on a table by holding the sheet above the particles. If the sheet can be placed to the latter particles at a close distance without the particles being attracted, the sheet is said to be antistatic. In utilizing the methylol derivative of the polyethoxamer, even at zero distance, no attraction is noted. After twenty and more successive washes, the sheet possesses antistatic properties, indicating the durability and permanency of the methylol derivative.

I claim:

1. A new composition of matter comprising an equimolar mixture of polymethylol derivatives of (*a*) N - (4 - amino - 6 - anilino - s - triazinylmethyl) - N,N,N - trimethylammonium chloride and (*b*) a N,N,N - (2 - hydroxyethyl) - N - (4 - amino - 6 - anilino - s - triazinylmethyl) ammonium chloride, the latter being represented by the formula:

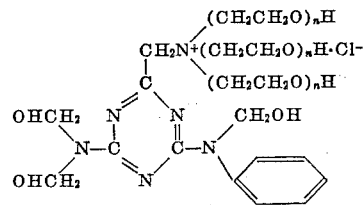

where $n$ is an integer from 2 to 11.

2. A new composition of matter comprising an equimolar mixture of trimethylol derivatives of (*a*) N - (4-amino - 6 - anilino - s - triazinylmethyl) - N,N,N - trimethylammonium chloride and (*b*) N,N,N - tris-(2-hydroxyethyl) - N - (4 - amino - 6 - anilino - s - triazinylmethyl) ammonium chloride having the structure:

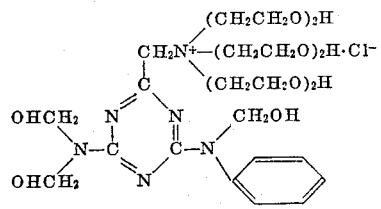

References Cited in the file of this patent
UNITED STATES PATENTS
2,719,156    De Benneville _____ Sept. 27, 1955

UNITED STATES PATENT OFFICE
Certificate of Correction

Patent No. 2,848,413                                              August 19, 1958

Walter H. Schuller

It is hereby certified that error appears in the printed specification of the above numbered patent requiring correction and that the said Letters Patent should read as corrected below.

Column 3, lines 30 and 31, for "a N,N,N-(2-hydroxyethyl) read —a N,N,N-tris-(2-hydroxyethyl)—.

Signed and sealed this 28th day of April 1959.

[SEAL]

Attest:
T. B. MORROW,
*Attesting Officer.*

ROBERT C. WATSON,
*Commissioner of Patents.*